(12) United States Patent
Ineson et al.

(10) Patent No.: US 6,431,340 B1
(45) Date of Patent: Aug. 13, 2002

(54) SOFT STOP MECHANISM AND METHOD

(75) Inventors: David J. Ineson, Oakville; Howard France, Watertown, both of CT (US)

(73) Assignee: Siemens VDO Automotive Corporation, Auburn Hills, MI (US)

(*) Notice: Subject to any disclaimer, the term of this patent is extended or adjusted under 35 U.S.C. 154(b) by 0 days.

(21) Appl. No.: 09/707,701

(22) Filed: Nov. 7, 2000

(51) Int. Cl.$^7$ .............. F16D 3/10; F16D 61/00
(52) U.S. Cl. .............. 192/223; 464/57; 464/169; 188/373
(58) Field of Search .............. 192/223.4, 149, 192/223; 188/373, 77 W, 371; 464/57, 61, 169, 62, 66, 65; 248/590; 74/411, 89.37; 403/109.3, 109.1, 229, 111, 325, 327

(56) References Cited

U.S. PATENT DOCUMENTS

| | | | |
|---|---|---|---|
| 701,872 A | 6/1902 | Giacomini | |
| 1,188,941 A | 6/1916 | Kiewicz | |
| 1,730,014 A | 10/1929 | Reece | |
| 2,417,434 A | * 3/1947 | Mead et al. ............... | 74/89.37 |
| 2,477,670 A | * 8/1949 | Toth et al. ................... | 192/149 |
| 2,598,709 A | * 6/1952 | Morris ...................... | 74/89.37 |
| 2,889,902 A | 6/1959 | Harrison et al. | |
| 4,281,747 A | * 8/1981 | Knobel et al. ........... | 192/223.4 |
| 4,493,673 A | * 1/1985 | Anders et al. ................ | 464/66 |
| 4,579,201 A | 4/1986 | Tiedeman | |
| 4,606,444 A | 8/1986 | Sekella | |
| 4,683,995 A | * 8/1987 | Periou ..................... | 192/223.4 |
| 5,037,231 A | * 8/1991 | Kitamura ................. | 188/77 W |
| 5,141,092 A | 8/1992 | Bevans et al. | |
| 5,226,528 A | * 7/1993 | Schaffer et al. ............. | 200/400 |
| 5,329,119 A | 7/1994 | Swartz et al. | |
| 5,389,040 A | * 2/1995 | Kakimi ....................... | 464/57 |
| 5,464,083 A | 11/1995 | Arnold et al. | |
| 5,492,097 A | * 2/1996 | Byram et al. ............... | 123/396 |
| 5,765,668 A | 6/1998 | Hasselberg et al. | |
| 5,842,659 A | * 12/1998 | Ligon et al. ............. | 242/394.1 |
| 6,220,109 B1 | * 4/2001 | Fischer et al. ............. | 74/337.5 |

FOREIGN PATENT DOCUMENTS

| | | |
|---|---|---|
| EP | 0396354 A2 | 4/1990 |
| EP | 2000008700 | 1/2000 |
| EP | 2000110435 | 4/2000 |

* cited by examiner

*Primary Examiner*—Rodney H. Bonck

(57) ABSTRACT

This invention offers advantages over the prior art by providing a simple, inexpensive mechanism and method for reducing the shock load on the drive of a rotary or linear actuator when the motion of the actuator output shaft is slowed, even to the point of stopping. This is referred to as bringing the actuator to a "soft stop." This invention uses a single spring wherein the spring may be a torsion, ribbon or compression spring. The mechanism generally includes a spring, a spring cup and a drive cup. When the motion of the output shaft is slowed or reaches its limit of travel, the spring begins to store energy and brings the drive cup to a soft stop.

16 Claims, 4 Drawing Sheets

SOFT STOP MECHANISM AND METHOD

BACKGROUND OF THE INVENTION

1. Field of the Invention

The invention relates to a method and mechanism for reducing the shock load on an actuator when the output shaft of the actuator is slowed or approaches its limit of travel.

2. Description of the Related Art

Prior art methods of and mechanisms for reducing shock load on an actuator generally included (1) rubber limit stops, (2) friction clutches, and (3) compression spring mechanisms. However, rubber limit stops do not work effectively over a wide temperature range due to changes in the durometer of the rubber with temperature. Friction clutches that use disks of material that are compressed together are susceptible to wear and change in torque with use. Compression spring mechanisms generally include two compression springs and a lever attached and extending perpendicularly from the output shaft. The lever rotates with the shaft and contacts a compression spring when the output shaft reaches its angular limit of travel. The disadvantages of the compression spring mechanism, in addition to requiring more than one spring, include that it is difficult to achieve similar rates of deceleration for the output shaft as it reaches each of its angular limits of travel because difference of spring rates (rate of deflection with a given load) between the two compression springs.

SUMMARY OF THE INVENTION

It is to be understood that both the foregoing general description and the following detailed description are exemplary and are intended to provide further explanation of the invention claimed.

This invention offers advantages over the prior art by providing a simple, inexpensive method for reducing the shock load on the drive of a rotary or linear actuator when the motion of the actuator output shaft is slowed, even to the point of stopping. This is referred to as bringing the actuator to a "soft stop." Additionally, the invention may include a spring and this spring stores energy that may be used to maintain a force against elements that may be attached to the invention's output shaft, such as a linkage, cable, or rod. This invention uses a single spring wherein the spring may be a torsion, ribbon or compression spring.

The accompanying drawings, which are incorporated in and constitute part of this specification, are included to illustrate and provide a further understanding of the invention. Together with the description, the drawings serve to explain the principles of the invention.

DETAILED DESCRIPTION OF THE PREFERRED EMBODIMENT

Figure 1:
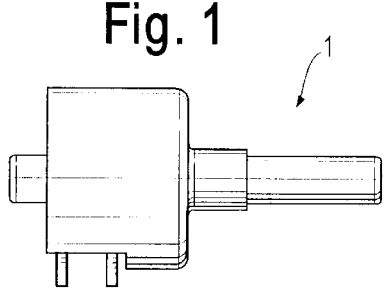
FIG. 1 is a side plan view of an embodiment of the soft stop mechanism including a torsion spring.

The purpose and advantages of the present invention will be set forth in and apparent from the description that follows, as well as will be learned by practice of the invention. Additional advantages of the invention will be realized and attained by the embodiments particularly pointed out in the written description and claims hereof, as well as from the appended drawings. Reference will now be made in detail to the present preferred embodiments of the invention, examples of which are illustrated in the accompanying drawings. The method and corresponding steps of the invention will be described in conjunction with the detailed description of the system.

The invention presented herein may be used to reduce the shock load in an actuator when the output shaft of the actuator is slowed, even to the point of stopping, or reaches its limit of travel. For purpose of explanation and illustration, and not limitation, an exemplary embodiment of the mechanism in accordance with the invention is shown in FIG. 1 and is designated generally by reference character 1.

Figure 2A:
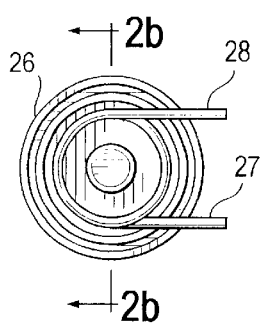
FIG. 2a is a front plan view of an embodiment of the soft stop mechanism including a torsion spring.
Figure 2B:
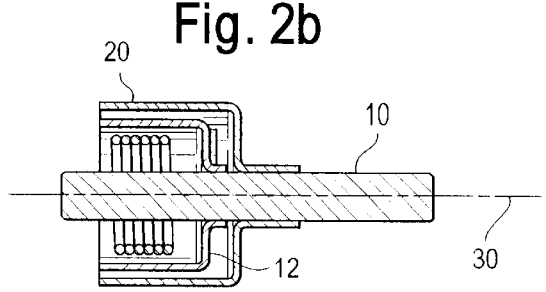
FIG. 2b is a side cross-sectional view of an embodiment of the soft stop mechanism including a torsion spring.
Figure 2C:
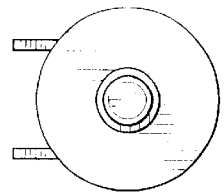
FIG. 2c is a back plan view of an embodiment of the soft stop mechanism including a torsion spring.
Figure 3:
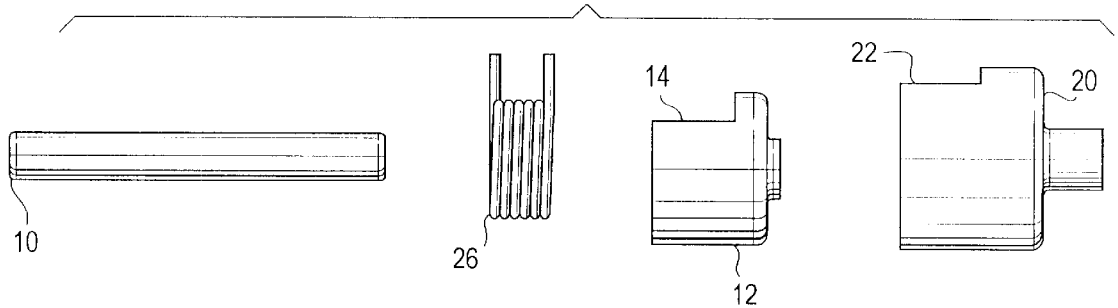
FIG. 3 is an exploded view of an embodiment of the soft stop mechanism including a torsion spring.

As shown in FIGS. 1, 2 and 3, the mechanism 1 generally includes a torsion spring 26, spring cup 12 and a drive cup 20. The torsion spring 26 is disposed about an output shaft 10 of an actuator (not shown). The spring cup 12, which includes a spring cup slot 14 is disposed about the torsion spring 26 and is operably connected to the output shaft 10 so that energy may be transferred between the output shaft 10 and the spring cup 12. Examples of how the spring cup 12 may be operably connected to the output shaft 10, include press fitting, brazing and the use of adhesive. Other examples include, laser, arc, plasma, MIG and TIG welding. The drive cup 20, which includes a drive cup slot 22, is disposed about the spring cup 12 so that it is rotatable about the output shaft 10. The spring cup 12 includes a spring cup slot 14 and the drive cup 20 includes a drive cup slot 22. The two ends 27 and 28 of the torsion spring 26 protrude through the spring cup slot 14 and the drive cup slot 22.

Specifically, and in accordance with the present invention, when the drive cup 20 is rotated, the output shaft 10 will rotate about its longitudinal axis 30. When the rotation of the output shaft is limited, slowed or stopped, the drive cup 20 will continue to rotate and the torsion spring 26 will begin to wind up and store energy. As the torsion spring 26 winds up, it brings the drive cup 22 to a soft stop. It is also possible to use another type of spring such as, but not limited to, a compression spring or a ribbon spring instead of a torsion spring.

Figure 4:
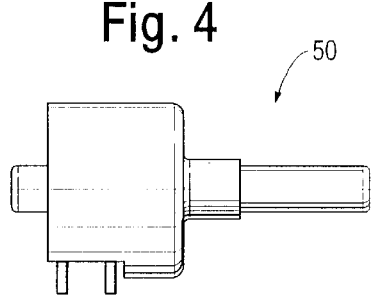
FIG. 4 is side plan view of an embodiment of the soft stop mechanism including a torsion spring and a support hub.
Figure 5A:
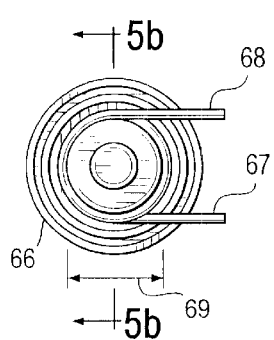
FIG. 5a is front plan view of an embodiment of the soft stop mechanism including a torsion spring and a support hub.
Figure 5B:
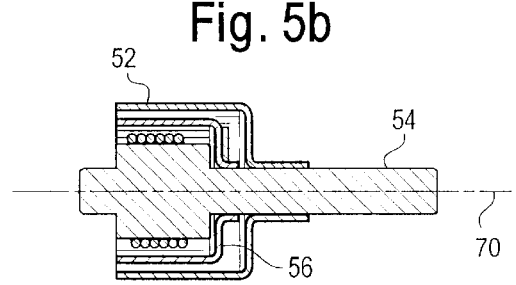
FIG. 5b is a cross-sectional view of an embodiment of the soft stop mechanism including a torsion spring and a support hub.
Figure 5C:
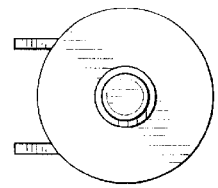
FIG. 5c is front plan view of an embodiment of the soft stop mechanism including a torsion spring and a support hub.
Figure 6:
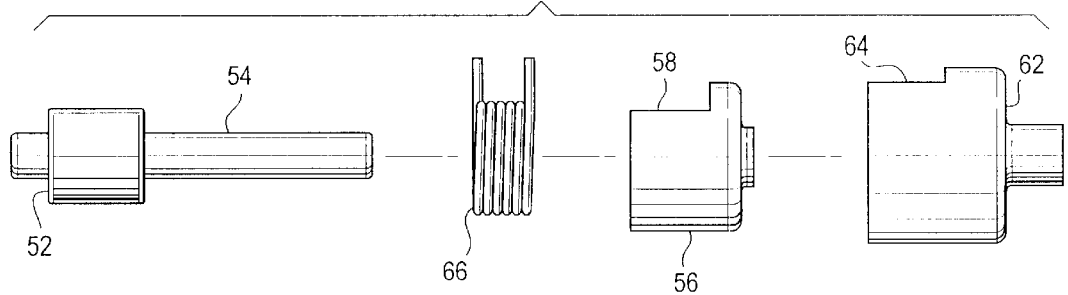
FIG. 6 is an exploded view of an embodiment of the soft stop mechanism including a torsion spring and a support hub.

In accordance with another embodiment of the invention, as shown in FIGS. 4 through 6, the mechanism 50 may also include a spring support hub 52. In this embodiment, the torsion spring 66 is disposed about the spring support hub 52 which is operably connected to the output shaft 54 of an actuator (not shown). The spring cup 56, which includes a spring cup slot 58, is disposed about the torsion spring 66 and operably connected to the output shaft 54 so that energy may be transferred between the output shaft 54 and the spring cup 56. The drive cup 62, which includes a drive cup slot 64, is disposed about the spring cup 52 so that it is rotatable about the output shaft 54. The spring cup 56 may be press fit and the drive cup 62 may be clearance fit to the output shaft 54. The two ends 67 and 68 of the torsion spring 66 protrude through the spring cup slot 58 and the drive cup slot 64.

Specifically, and in accordance with the present invention, when the drive cup 62 is rotated, the output shaft 54 will rotate about its longitudinal axis 70. When the rotation of the output shaft is limited, slowed or stopped, the drive cup 62 will continue to rotate, the torsion spring 66 will wind up and store energy and the inner diameter 69 of the torsion spring 66 will reduce. As the inner diameter gets smaller, it interferes with the rotation of the spring support hub 52 and thus the output shaft 54. Therefore, the reduction in size of the inner diameter 69 and the winding up of the torsion spring 66 both bring the drive cup 62 to a soft stop. It is also possible to use another type of spring such as, but not limited to a compression spring or a ribbon spring instead of a torsion spring.

Figure 7:
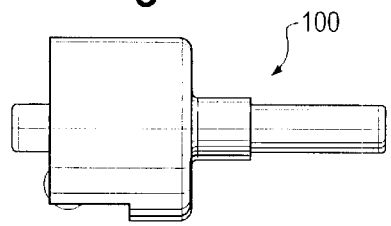
FIG. 7 is side plan view of an embodiment of the soft stop mechanism including a compression spring.
Figure 8A:
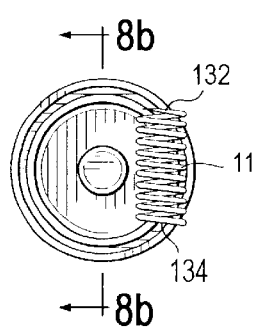
FIG. 8a is front plan view of an embodiment of the soft stop mechanism including a compression spring.
Figure 8B:
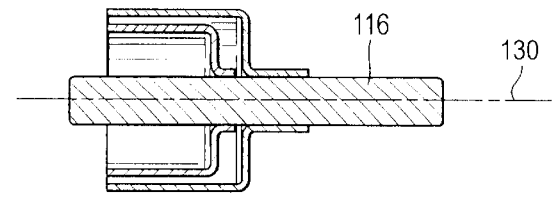
FIG. 8b is cross-sectional view of an embodiment of the soft stop mechanism including a compression spring.
Figure 8C:
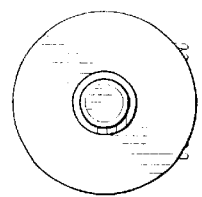
FIG. 8c is back plan view of an embodiment of the soft stop mechanism including a compression spring.
Figure 9A:
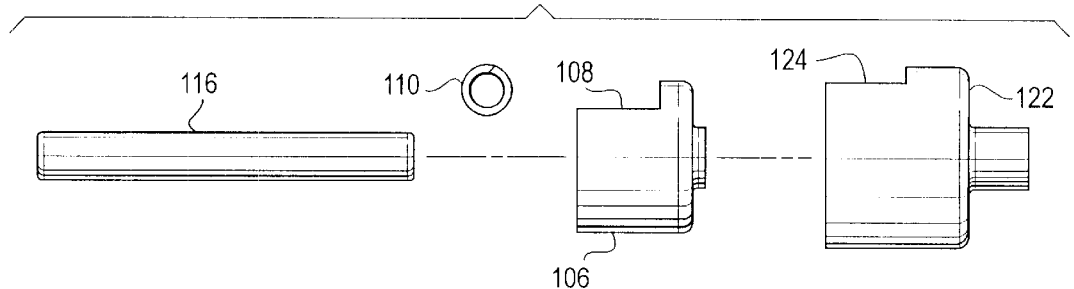
FIG. 9a is an exploded view of an embodiment of the soft stop mechanism including a compression spring.
Figure 9B:
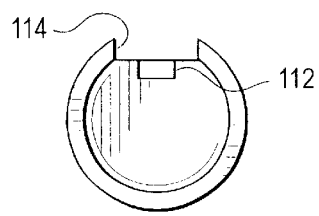
FIG. 9b is a cross-sectional view of the spring cup and the drive cup.

In accordance with another embodiment of the invention, as shown in FIGS. 7 through 9, the mechanism 100 may also include a single compression spring 110. In this embodiment, the spring cup 106 which includes a spring cup slot 108 is disposed about and operably connected to the output shaft 116 so that energy may be transferred between the output shaft 116 and the spring cup 106. The drive cup 122, which includes a drive cup slot 124, is disposed about the spring cup 106 so that it is rotatable about the output shaft 116. The spring cup 106 may be press fit and the drive cup 122 may be clearance fit to the output shaft 116. The compression spring 110 is located within the spring cup slot 108 and the drive cup slot 124. The first end 132 of the compression spring 110 is attached to the first edge 114 of the drive cup slot 124 and the second end 134 of the compression spring 110 is attached to the second edge 112 of the spring cup slot 108.

Specifically, and in accordance with the present invention, when the drive cup 122 is rotated, the output shaft 116 will rotate about its longitudinal axis 130. When the rotation of the output shaft 116 is slowed even to the point of stopping or reaches its limit of travel, the drive cup 122 will continue to rotate and the compression spring 110 will compress and store energy. This compression of the compression spring 110 brings the drive cup 122 to a soft stop.

Figure 10:
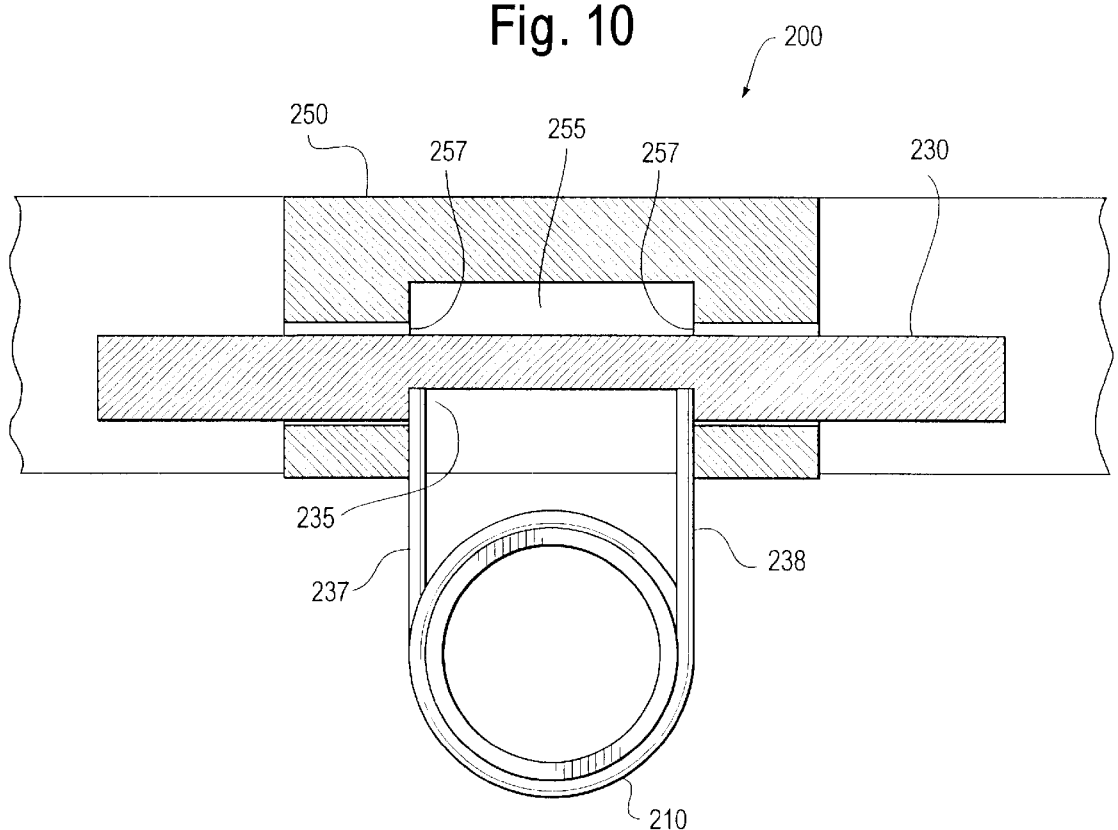
FIG. 10 is a cross-sectional view of an embodiment of the soft stop mechanism as implemented in a linear actuator.

In accordance with another embodiment of the invention, as shown in FIG. 10, soft-stop mechanism 200 may be implemented in a linear actuator. In this embodiment, the input shaft 250 includes and input shaft slot 255 and at least one hole 257 and the output shaft 230 includes an output shaft slot 235. The output shaft 235 is disposed within the at least one hole 237 and linearly movable therein. A torsion spring 210 includes a first end 237 and a second end 238 which protrude into the input shaft slot 255 and the output shaft slot 235.

Specifically, and in accordance with the invention, as the input shaft 250 moves linearly, the output shaft 230 will move linearly. When the motion of the output shaft 230 is limited, slowed or stopped, the input shaft 250 will continue to move linearly and the torsion spring will begin to wind up and store energy. As the torsion spring winds up, it brings the input shaft 250 to a soft stop. It is also possible to use another type of spring such as, but not limited to, a compression spring or a ribbon spring instead of a torsion spring.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

We claim:

1. A mechanism for use with an actuator, wherein the actuator includes a drive and an output shaft capable of rotational motion, wherein the mechanism slows the drive comprising:
    a spring cup, wherein the spring cup comprises a spring cup slot and is operably connected to the output shaft;
    a drive cup operably connected to the drive of an actuator, wherein the drive cup comprises a drive cup slot, is disposed about the spring cup and is rotatable about the output shaft; and
    a torsion spring including two ends and an inner diameter wherein the inner diameter is disposed about the output shaft and the two ends protrude through the spring cup slot and the drive cup slot and wherein the torsion spring has sufficient tension to gradually stop the drive cup from rotating when the output shaft is stopped.

2. A mechanism as claimed in claim 1, wherein the inner diameter of the torsion spring reduces as the rotational motion of the output shaft slows.

3. A mechanism as claimed in claim 2, wherein the drive cup is a clearance fit to the output shaft and the spring cup is a press fit to the output shaft.

4. A mechanism as claimed in claim 2, further comprising, a spring support hub operably connected about the output shaft and between the torsion spring and the output shaft.

5. A mechanism for an actuator, wherein the actuator includes an output shaft, comprising:
    a spring cup, wherein the spring cup comprises a spring cup slot which includes a first edge and is operably connected to the output shaft;
    a drive cup, wherein the drive cup comprises a drive cup slot which includes a second edge, is disposed about the spring cup and is rotatable about the output shaft; and
    a spring comprising a first end and a second end, wherein the spring is coiled around the output shaft and located within the drive cup slot and the spring cup slot and the first end is attached to the first edge and the second end is attached to the second edge wherein the spring has sufficient tension to gradually stop the drive cup from rotating when the output shaft is stopped.

6. A mechanism as claimed in claim 5, wherein the spring is a compression spring.

7. A mechanism as claimed in claim 5, wherein the spring is a ribbon spring.

8. A method for slowing rotation of a device in response to slowing rotation of an output shaft wherein the device rotates about its longitudinal axis, comprising the steps of:

disposing a body that comprises a single spring and an inner diameter about the longitudinal axis of the shaft and is operably connection to the device;

storing energy in the single spring in response to slowing the rotation of the output shafts wherein the spring is selected with sufficient tension to gradually stop the body in response to the halt of the rotation of the output shaft.

9. The method as claimed in claim 8, wherein the single spring is a torsion spring which includes a torsion spring inner diameter and the inner diameter is the torsion spring inner diameter.

10. The method as claimed in claim 9, wherein the shaft further comprises a spring support hub operably connected about the shaft and between the torsion spring and the output shaft and the method further comprises the step of reducing the inner diameter of the single spring.

11. The method as claimed in claim 9, wherein, the body further comprises:

a spring cup, wherein the spring cup comprises a spring cup slot which is operably connected to the output shaft and is disposed about the single spring; and a drive cup, wherein the drive cup comprises a drive cup slot which is disposed about the spring cup and is rotatable about the second shaft.

12. The method as claimed in claim 8, wherein the device connects to a drive of an actuator and the output shaft is an output shaft of an actuator.

13. The method as claimed in claim 8, wherein:

the body further comprises a spring cup, wherein the spring cup comprises a spring cup slot which includes a first edge and is operably connected to the second shaft;

a drive cup, wherein the drive cup comprises a drive cup slot which includes a second edge, is disposed about spring cup and is rotatable about the second shaft; and the single spring comprises a first end and a second end, wherein the spring is located within the drive cup slot and the spring cup slot and the first end is attached to the first edge and the second end is attached to the second edge.

14. A method as claimed in claim 13, wherein the single spring is a compression spring.

15. A method as claimed in claim 13, wherein the single spring is a ribbon spring.

16. A mechanism for use with an actuator, comprising:

an input shaft including an input shaft slot and at least one hole;

an output shaft including an output shaft slot, wherein the output shaft is disposed within the at least one hole and linearly movable therein; and a torsion spring including a first end and a second end, wherein the first end and the second end protrude into the input shaft slot and the output shaft slot.

* * * * *